F. H. ADAMS.
TURN TABLE.
APPLICATION FILED MAY 23, 1910.
1,006,172.
Patented Oct. 17, 1911.
7 SHEETS—SHEET 4.
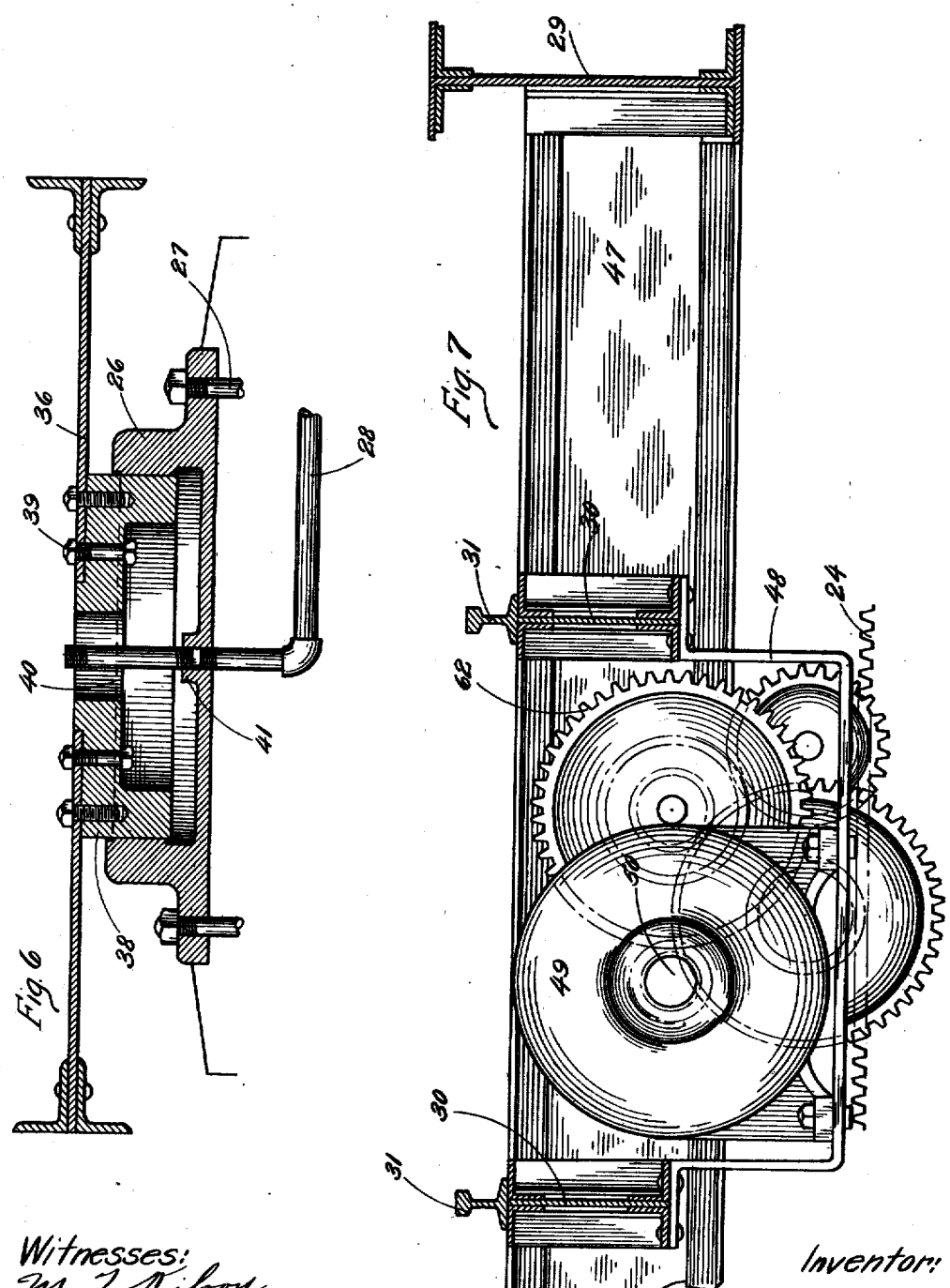
Witnesses:
M. J. Kilroy
Edythe W. Anderson
Inventor:
Frank H. Adams
By Sheridan, Wilkinson, Scott & Richmond, Attys

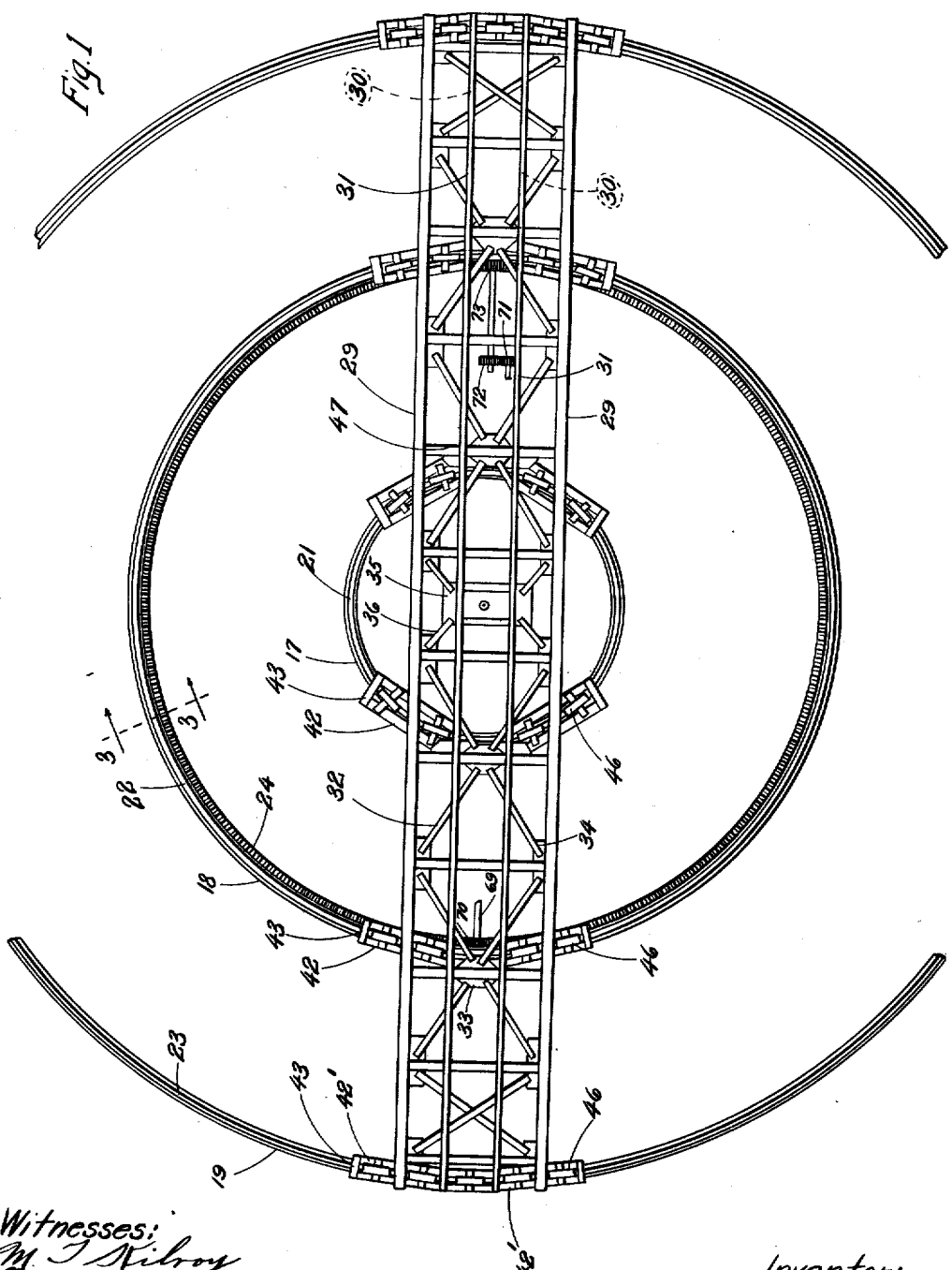

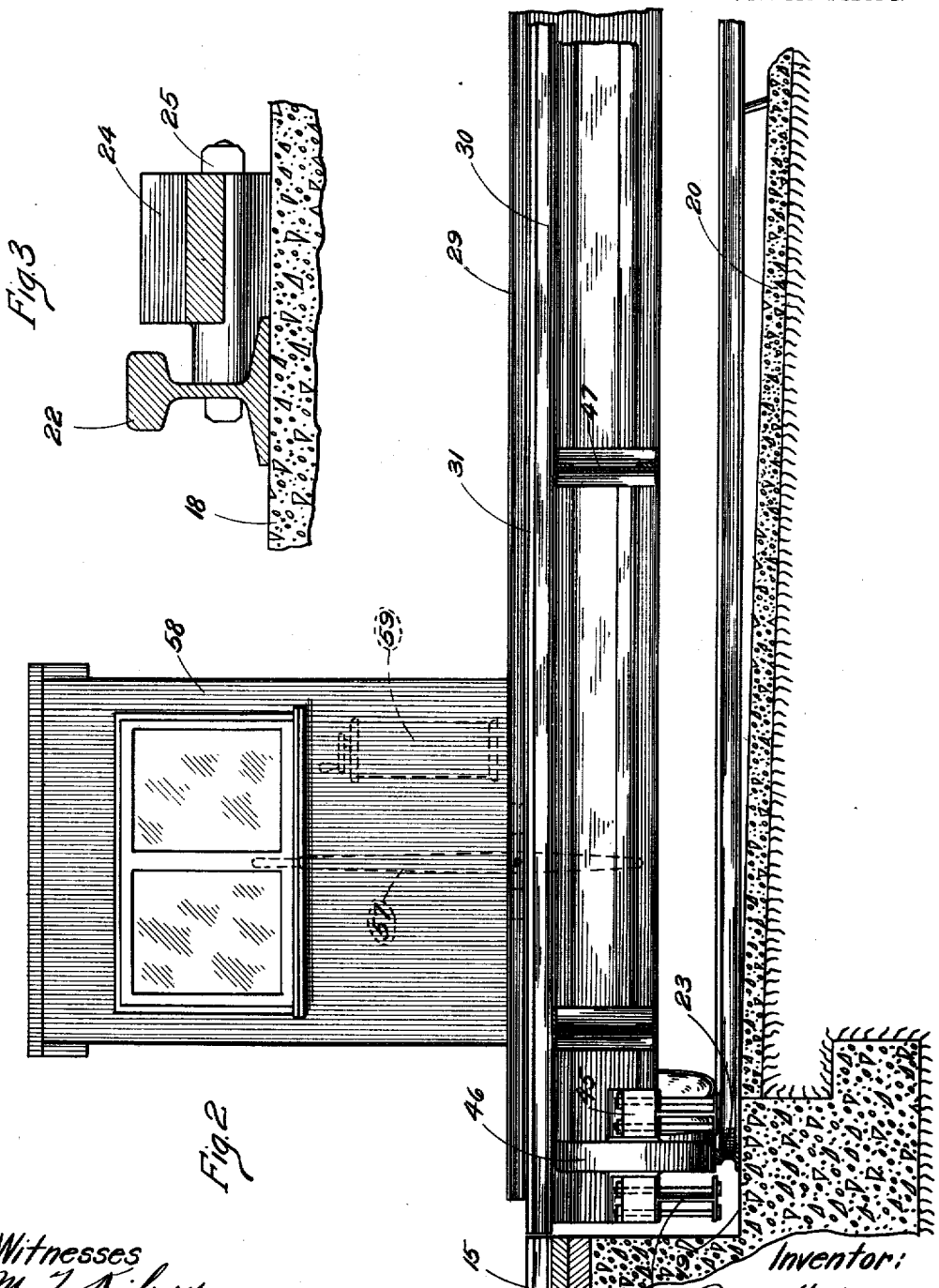

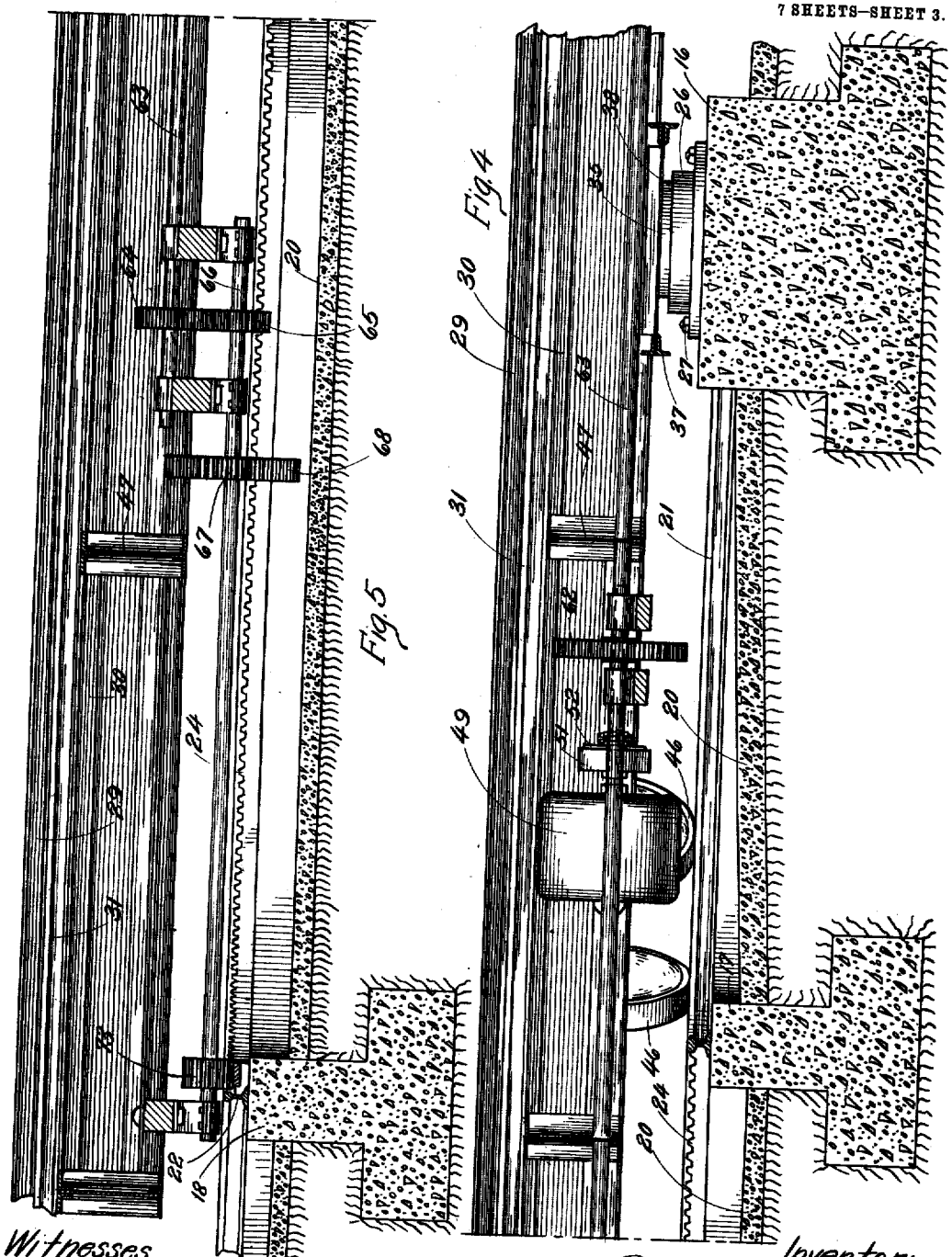

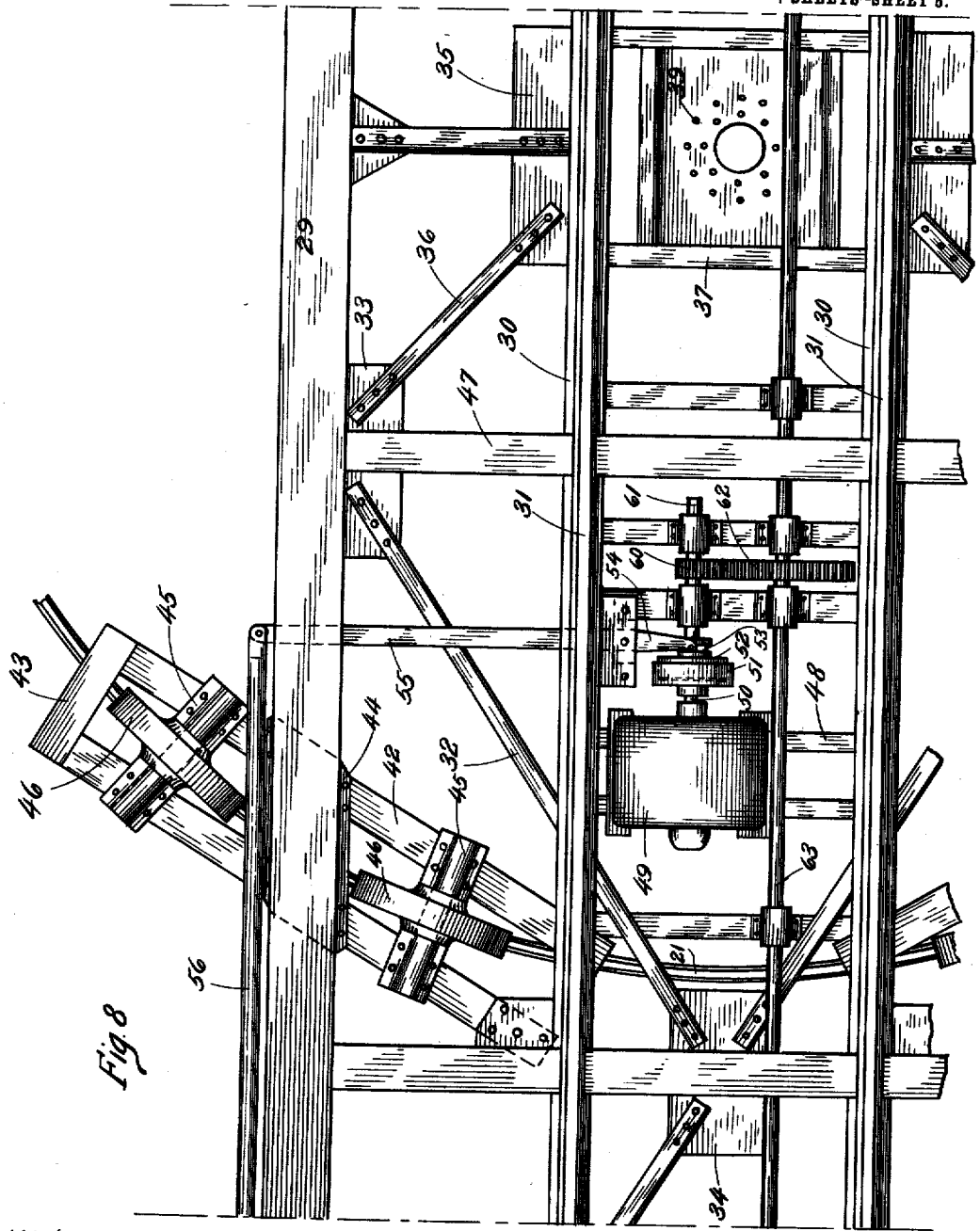

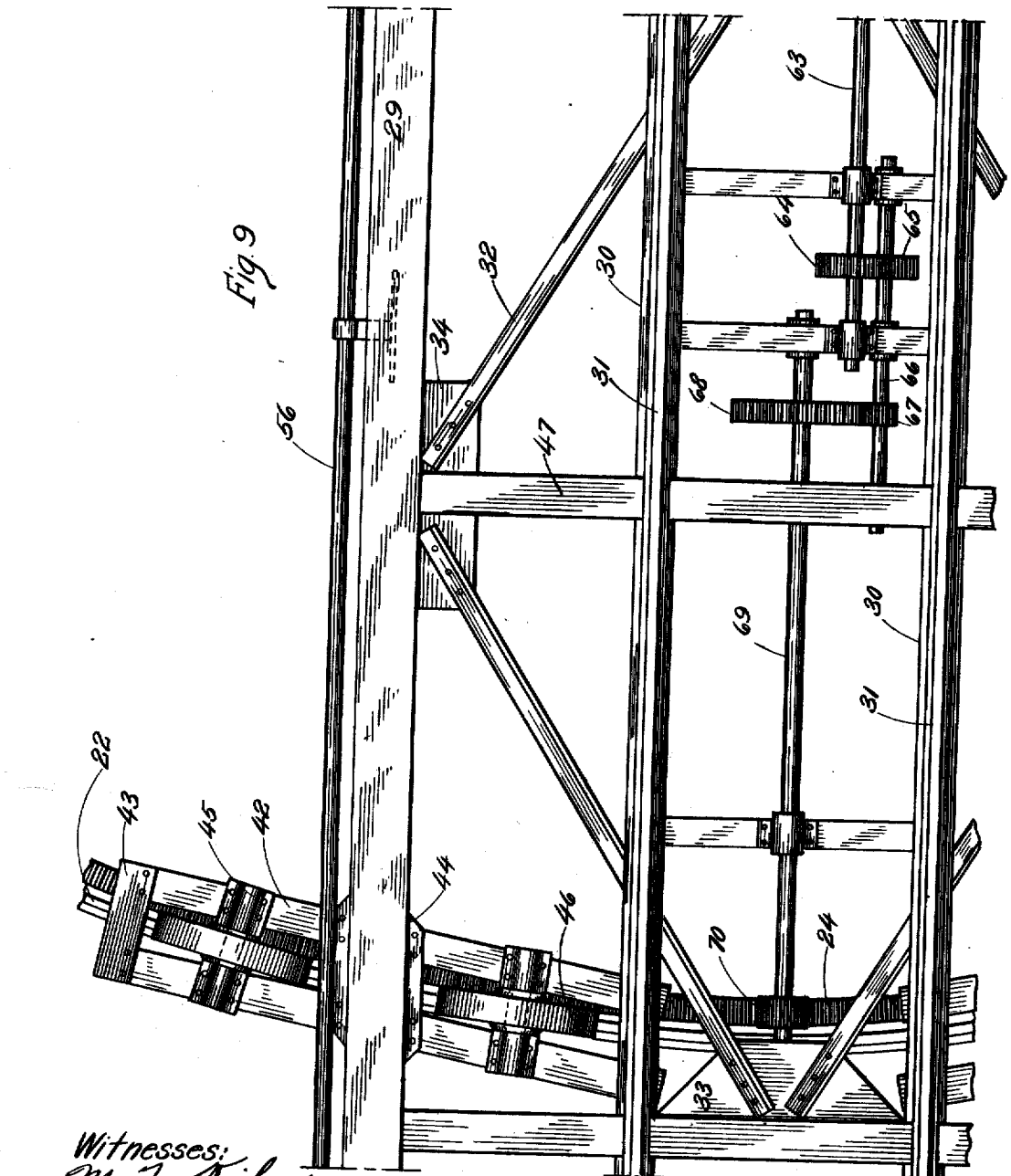

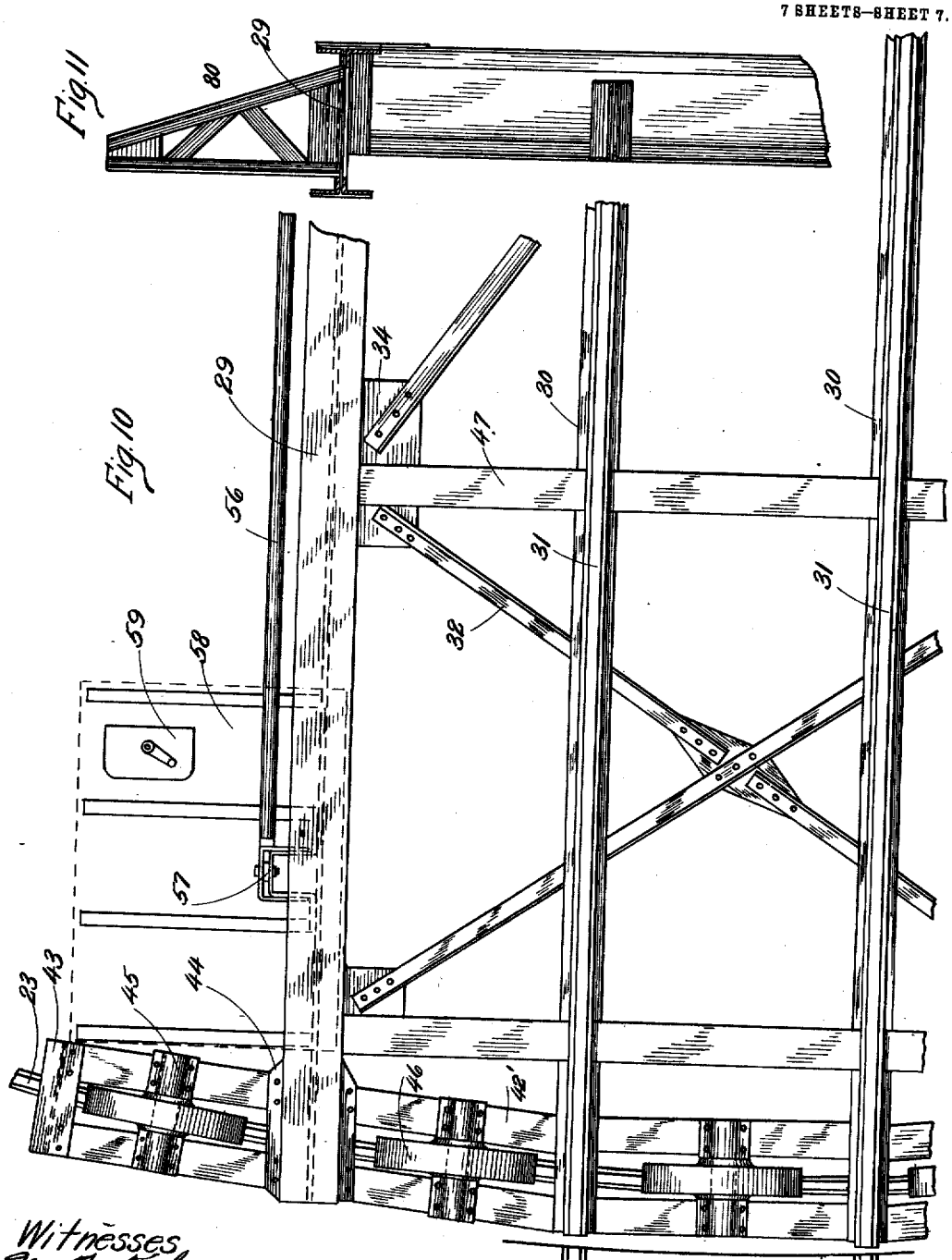

UNITED STATES PATENT OFFICE.

FRANK H. ADAMS, OF TOPEKA, KANSAS.

TURN-TABLE.

1,006,172.  Specification of Letters Patent.  Patented Oct. 17, 1911.

Application filed May 23, 1910. Serial No. 562,869.

*To all whom it may concern:*

Be it known that I, FRANK H. ADAMS, a citizen of the United States, residing at Topeka, in the county of Shawnee and State of Kansas, have invented certain new and useful Improvements in Turn-Tables, of which the following is a specification.

The principal object of my invention is to provide a new and improved turn table adapted to carry the heaviest type of modern locomotives.

Another object of my invention is to provide a turn table with the supporting and centering means combined to operate in an advantageous manner.

Another object of my invention is to provide a turn table having a structural design that shall give good supporting strength for the material employed.

A still further object of my invention is to provide simple and advantageous mechanism for actuating and operating the turn table.

Other objects of my invention relate to simplicity of construction, economy of manufacture, and facility for use.

All these and other objects will be made apparent in the following specification and claims, taken in connection with the accompanying drawings. In these drawings I have selected for illustration one particular embodiment of my invention, but it will be understood that the invention itself is defined in the appended claims.

Figure 1 is a general plan view of the turn table. Fig. 2 is a vertical longitudinal section of one end thereof. Fig. 3 is a detail cross section on the line 3, 3 in Fig. 1. Fig. 4 is a vertical longitudinal section at the central part of the turn table. Fig. 5 is a vertical longitudinal section of the turn table comprising a portion thereof intermediate between the center and one end. Fig. 6 is a detail vertical section of the center guide bearings. Fig. 7 is a transverse section of the turn table showing the motor and gearing. Fig. 8 is a plan view of the portion of the turn table adjacent to the center. Fig. 9 is a plan view of the turn table showing a portion thereof intermediate between the center and one end. Fig. 10 is a plan view of one end of the turn table. Fig. 11 is an elevation of a structural detail showing the support for the operator's cab.

The stationary rails, leading up to the edge of the turn table pit, are indicated by the reference numeral 15. Within the pit at the center is a central column 16 of masonry or concrete which supports a center guide to be described presently. Around this central column 16 are three circular foundations 17, 18 and 19 of concrete or masonry, and between these the pit is paved with concrete 20, or other suitable material. On the three concentric circular foundations, just mentioned, there are respective circular T-head rails 21, 22 and 23. The intermediate rail 22 has attached thereto a rack 24, this being bolted to the web of the rail 22 by bolts 25.

The center foundation 16 has bolted thereto, by means of the bolts 27, a bottom center guide casting 26 (see Fig. 6). A conduit pipe 28 leads through the pier 16 and up through the guide casting 26, a tight screw threaded joint being made at 41. This conduit 28 is provided for an electric cable to supply the motor that will be described presently.

The main frame of the turn table comprises the two parallel girders 29, the inner smaller girders 30 on which the rails 31 are mounted, the diagonal members 32, the cross members 47, and the gusset plates 33 and 34. At the center there is a horizontal plate 35 secured by structural members 36 to the main frame that has just been described. This plate 35 is stiffened along its edges by angle irons 37 and is secured at its center by means of the bolts 39 to the top center guide casting 38. The two castings 26 and 38 fit closely together, as shown in Fig. 6, and it is intended that oil shall be filled in the casting 26 up about to the level 40. It will be observed from Fig. 6 that the casting 38 is definitely centered in the casting 26, but still remains free to move up or down.

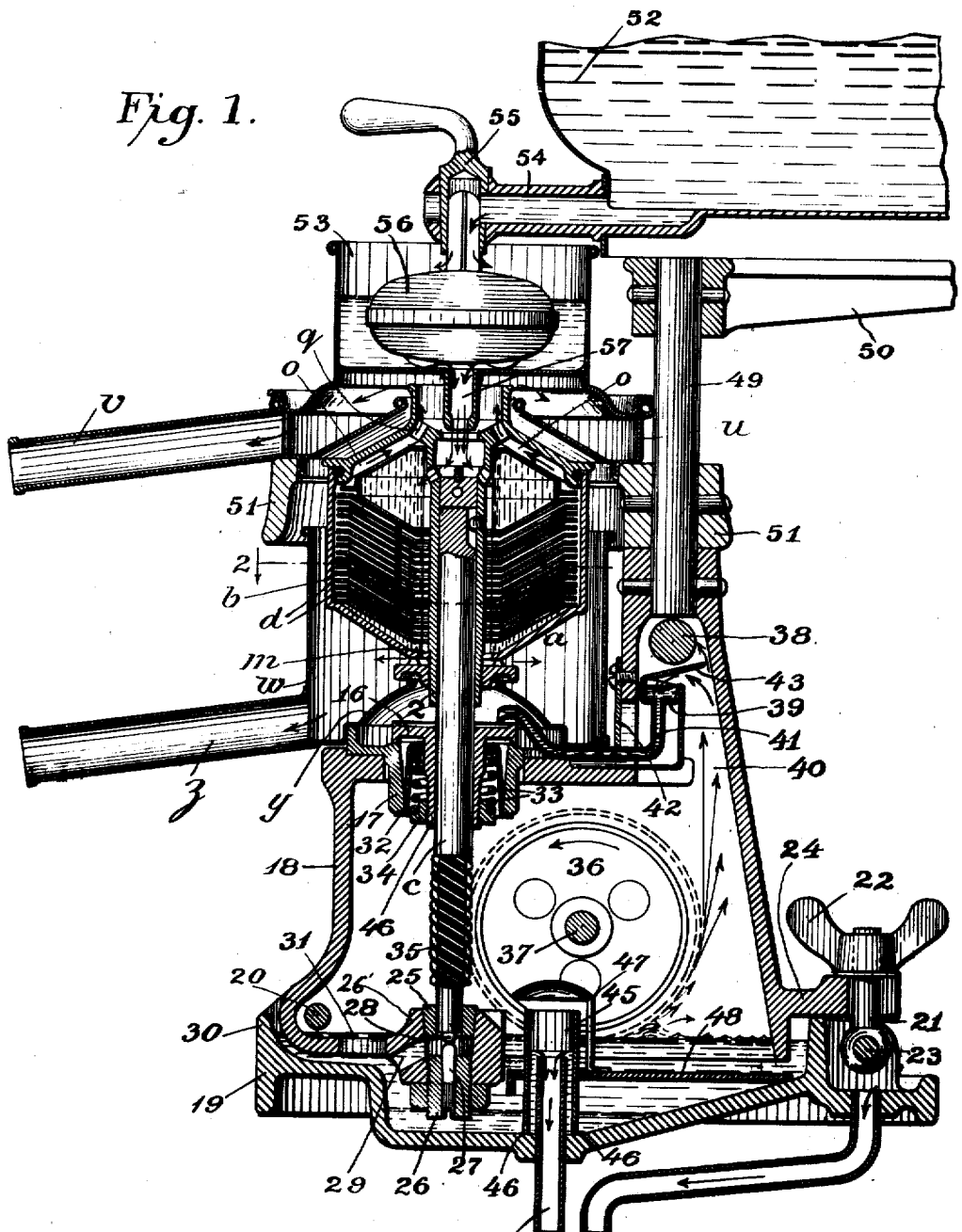

Under the girders 29 are frames to carry the wheels 46. These frames comprise parallel I-beams 42 in pairs, joined at their ends by cross members 43 and having journal boxes 45 attached to them. Plates 44, between the girders 29 and the I-beams 42, secure the parts together by being riveted to both members. The frames made up of the I-beams 42 have a general direction which is perpendicular to the respective radii drawn therefrom to the center of the turn table. The journal boxes 45 are attached to these frames 42, so that the axles